Feb. 20, 1940. G. C. GREENE 2,191,252
EYEGLASS TEMPLE CONNECTION
Filed Sept. 15, 1938
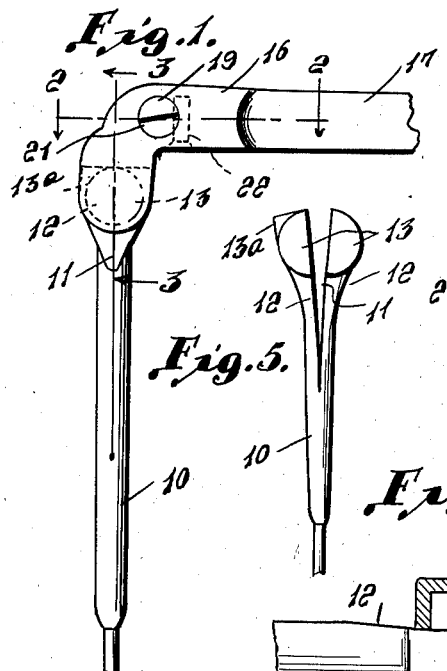
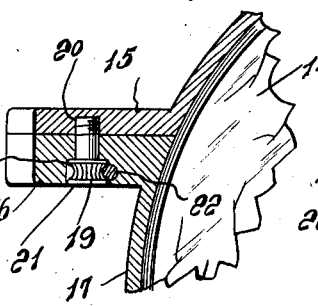
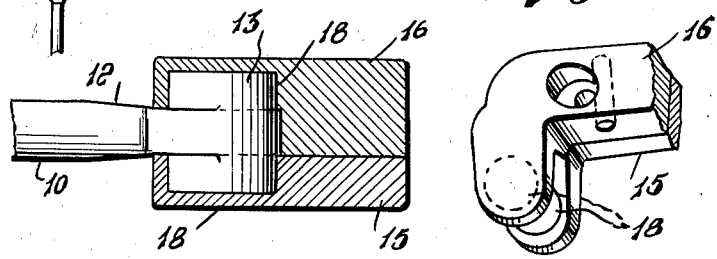
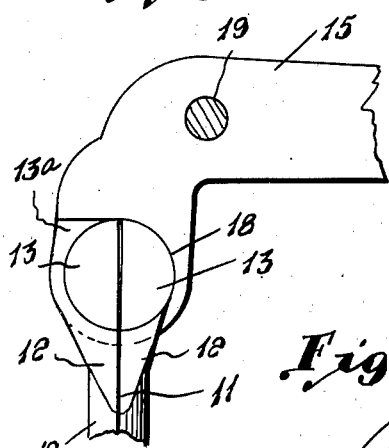
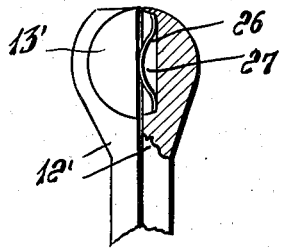
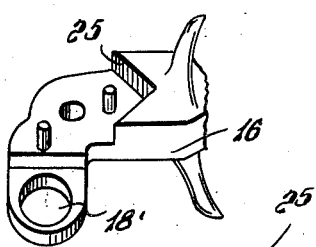
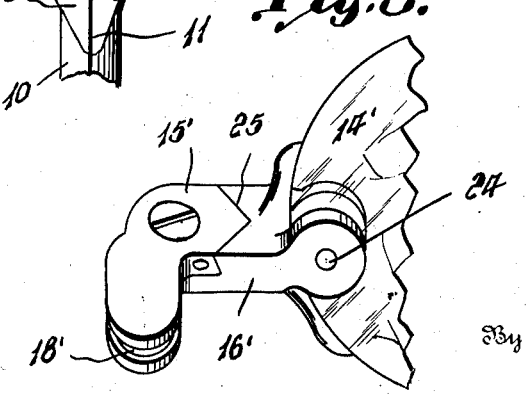
Inventor
Grover C. Greene
Attorney Patented Feb. 20, 1940

2,191,252

UNITED STATES PATENT OFFICE 2,191,252

EYEGLASS TEMPLE CONNECTION

Grover C. Greene, Marion, N. C., assignor of one-half to Princhas N. De Vere, Marion, N. C.

Application September 15, 1938, Serial No. 230,135

3 Claims. (Cl. 88—53)

This invention relates to ophthalmic frames and mountings, more particularly to temples, temple connections and eyewire screws.

It is an object of this invention to prevent temples on ophthalmic frames and mountings from becoming loose and wobbly as they become worn from use.

It is also an object of this invention to provide a novel structure wherein the eyewire screw of ophthalmic frames and mountings can be locked in place.

It is a further object of this invention by its novel structure to present a more harmonious endpiece for ophthalmic frames and mountings.

It is aimed to provide a novel structure wherein the temple may be held in various positions, even after lengthy use, solely by friction, and more specifically through compression of an expansible end portion, which is thereby tensioned, and coacts with parts of an ophthalmic frame or mounting.

The more specific objects and advantages will become apparent from a consideration of the description following taken in connection with the accompanying drawing illustrating an operative embodiment.

In said drawing:

Figure 1 is a plan view showing the temple mounted in the endpiece of a frame;

Figure 2 is a detail section taken on the line 2—2 of Figure 1;

Figure 3 is a detail section taken on the line 3—3 of Figure 1;

Figure 4 is a horizontal section through the endpiece of the eyewires;

Figure 5 is a detail view showing the end portions of the temple expanded, also the square projection on the outside portion;

Figure 6 is a detail perspective view of the frame showing the endpieces of the eyewire together;

Figure 7 is a detail perspective view of the eyewire screw for endpiece of the frame eyewires;

Figure 8 is a detail perspective view showing a modified form of an endpiece as used on a mounting for rimless glasses;

Figure 9 is a detail perspective view of another form of an endpiece which may be used on a mounting for rimless glasses.

Figure 10 is a detail perspective view of the other side of the endpiece shown in Figure 9; and Figure 11 is a detail plan view of one end portion of a modified form of temple.

Referring specifically to the drawing and first to the form of Figures 1 to 7, each temple 10 employed for use in ophthalmic frames or mountings has one end split as at 11, whereby expanding portions 12 are provided, being unrestricted in the condition shown in Figure 5. Such portions above and below the temple proper have semi-circular tenon portions 13, the outside semi-circular tenon portion has a square shoulder 13a which prevents the temple from moving too far out from the frame. The tenon portions may be cast integral with the temples or attached thereto as preferred.

Associated with each lens of the glass or spectacle designated 14 are separable eyewires 15 and 16. In the form of the invention shown in Figures 1 to 7, such eyewires form part of the frame 17, which surrounds the lenses 14 and which are split intermediate said eyewires 15 and 16, which are continuations of the opposite ends of such frame 17. Said eyewires 15 and 16 have sockets as at 18 in which the tenon portions 13 are disposed, it being necessary to move such tenon portions 13 into contact in order to occupy the sockets 18. As a result, the split portions 12 are placed under tension and tenon portions 13 will always frictionally engage the peripheral walls of the recesses where the eyewires come together, and this frictional action will be maintained throughout the life of the temples and ophthalmic frames or mountings as a whole. No screws, or other extraneous fastenings, are therefore necessary in connection with the mounting of the temples.

In order to hold the eyewires 15 and 16 together, a screw member 19 passes through one of them and is screw threaded as at 20 in the other. Such screw 19 has a head 21 journaled in the eyewire 16 and to prevent its loosening or self-displacement a set screw 22 is threaded through the rear of the eyewire at the endpiece and engages a threaded gear similar to a worm gear at 23 in the periphery of the head 21.

In the modified forms of Figures 8 to 11, the same principle and construction as in the preceding form is followed for the connection of the temple to the endpiece. In this form of the invention, the lens 14' does not have a surrounding frame like that at 17. It does have jaws 15' and 16' functioning like the eyewires at 15 and 16, and which are secured in any suitable manner as at 24, to the lens 14'. Such jaws 15' and 16' interengage at a pointed cut-out sloping portion as at 25, and also shown to interengage another form of jaws with a pointed and straight cut-out portion as shown in Figures 9 and 10. Such jaws have recesses or sockets as at 18' and the same may be engaged by the tenon portions 13 of the temple 10 or they may be engaged by the modified form of temple shown in Figure 11. This modified form of temple has portions 12', normally expanded away from each other and extending from a temple as at 10. Such portions 12' are separated by an expansive leaf spring such as 26, located in a recess 27 between the portions 12'. Such portions at top and bottom have tenon portions 13', corresponding to and functioning like those at 13.

Various changes may be resorted to provided they fall within the spirit and scope of the invention.

I claim as my invention:

1. In a mounting of the class described, lens-mounting jaws, a temple split inwardly from one end providing portions normally urged away from each other at the outer end of the temple, tenon portions extending from opposite sides of said portions intersected by the split, said jaws being separable on a line intersecting said split and having sockets extending from opposite sides of said line, said sockets being of less diameter than the normal diameter of the associated tenon portions, said tenon portions being engaged in said sockets when said first mentioned portions are compressed toward each other, so that the tenon portions will be expansive in the sockets, and means separably connecting the jaws together.

2. In a mounting of the class described, lens-mounting jaws, a temple split inwardly from one end providing portions normally urged away from each other at the outer end of the temple, tenon portions extending from opposite sides of said portions intersected by the split, said split extending inwardly beyond the tenon portions, said jaws being separable on a line intersecting said split and having sockets extending from opposite sides of said line, said sockets being of less diameter than the normal diameter of the associated tenon portions, said tenon portions being engaged in said sockets when said first mentioned portions are compressed toward each other, so that the tenon portions will be expansive in the sockets, and means separably connecting the jaws together, one of the first mentioned portions at the split having a recess, and spring means within the recess abutting the opposed first mentioned portion and urging separation of said first mentioned portions.

3. In a mounting of the class described, lens-mounting jaws, a temple split inwardly from one end providing portions normally urged away from each other at the outer end of the temple, tenon portions extending from opposite sides of said portions intersected by the split, said split extending inwardly beyond the tenon portions, said jaws being separable on a line intersecting said split and having sockets extending from opposite sides of said line, said sockets being of less diameter than the normal diameter of the associated tenon portions, said tenon portions being engaged in said sockets when said first mentioned portions are compressed toward each other, so that the tenon portions will be expansive in the sockets, and means separably connecting the jaws together, and a shoulder at the outer extremity of one of said portions intermediate the tenon portions thereof engageable with one of the end pieces to limit the swinging movement of the temple.

GROVER C. GREENE.